34. DRYING & GAS OR VAPOR CONTACT WITH SOLIDS.
80 Patented Dec. 24, 1940

2,225,627

UNITED STATES PATENT OFFICE 2,225,627

METHOD FOR THE CONCENTRATION AND PRESERVATION OF FOOD PRODUCTS AND BIOLOGICAL SUBSTANCES

Earl W. Flosdorf, Ardmore, Pa., assignor to F. J. Stokes Machine Company, a corporation of Pennsylvania No Drawing. Original application March 19, 1937, Serial No. 131,832. Divided and this application December 7, 1937, Serial No. 178,537

8 Claims. (Cl. 34—24)

This is a division of my application filed March 19, 1937, under Serial No. 131,832.

This invention relates to new and improved methods in the concentration, drying and preservation of food products and biological substances, such as liquid or semi-liquid fruit juices, vegetable products (soups, etc.), protein solutions, normal and immune blood serum, bacterial cultures, viruses and other labile biological and organic substances; and, more particularly, to methods for the treatment and preservation of food products and biological substances by freezing the substance and dehydrating it from the frozen or semi-frozen state under vacuum and by means of and through the use of regenerable chemical desiccants.

The invention includes features which result in a great economy in the methods of dehydrating food and biological substances while at the same time producing an improved product.

Some of the purposes of my invention in dehydrating food products from the frozen state are:

To eliminate loss of quality;
To favor retention of volatile constituents;
To prevent chemical changes;
To prevent multiplication of micro-organisms and changes in the product caused by such contaminants;
To increase the keeping quality for an extended period; and
To improve stability;

all of which can only be accomplished by locking the molecules together in the frozen state. Locked in this condition, chemical change in and interaction of solute molecules during the evaporation of the solvent is prevented. By other processes, using higher temperatures for evaporation, chemical change in and interaction and growth of micro-organisms is accelerated even beyond that point normal for the substance of ordinary storage temperature.

Another purpose, particularly of importance in dealing with food products, is to decrease the weight and incidentally also the volume, which results in such economies as lower carriage charges, smaller containers, etc. For this purpose, where indefinite preservation is not required, only concentration to say 5% to 75% volume, and not complete dehydration, would be necessary.

It is also the purpose of this invention to provide improved apparatus suitable for the efficient practice of my invention.

The invention includes various features and improvements in the process, apparatus and resulting product as hereinafter described.

The desirability of dehydrating biologically active substances from a frozen state is described in my co-pending applications, Serial Nos. 54,148 and 54,149, both filed December 12, 1935; and 54,450, filed December 14, 1935, now Patent No. 2,163,996, issued June 27, 1939, and in the John Reichel application 706,547, filed January 13, 1934, now Patent No. 2,066,302, issued December 29, 1936. Those applications disclose and claim methods and apparatus in which a low temperature refrigerating mixture, preferably consisting of solid carbon dioxide, "Dry-Ice," suspended in a suitable organic liquid, is used for laboratory and clinical purposes in dehydrating so-called "Lyophile" products. The processes described in the the above-mentioned applications require very low temperature, around minus 70° C. or lower, and special means for obtaining this low temperature is therefore required. The solid carbon dioxide in the refrigeration mixture described in the above applications for the rapid and complete freezing of the liquid product placed in the individual containers, as well as around the necessary condenser in which the vapor is collected, can only be used once and the cost therefore, when considering the commercial dehydration of food products, is prohibitive. Minus 70° C. is required for the initial rapid freezing of the product but during the desiccation the temperature of the product rises to an equilibrium value.

This present invention eliminates the need of the expensive condensers with their also costly but necessary refrigerating mixture and replaces these accessories by a new device in which a regenerative chemical desiccant is used. I have arbitrarily chosen the word "Cryochem" as the name for my new process and product in order to simplify the identification and eliminate lengthy description. It will also make it easy to distinguish this process and product from the "Lyophile" process and apparatus disclosed in my co-pending applications of 1935.

It should be understood that the high-vacuum, rapid dehydration from the frozen state, for preservation purposes where the rapidity of evaporation automatically maintains the drying biological substance in the frozen condition, is not new. This was set forth as early as 1909 by L. F. Shackell (Amer. Jour. Physiol., 1909, 24, 325) in which sulfuric acid was used as the absorbent for the water-vapor. Only recently, however, have methods been developed which have been sufficiently inexpensive and practicable in operation for the commercial preservation of biological substances, such as is described in my co-pending applications referred to above. Nevertheless, none of the processes developed up to the present time has been sufficiently inexpensive in operation for commercial use with and for products as commercially low in value as food substances.

It should be further understood that it is not the high vacuum which is the factor responsible for the high cost. As pointed out in my co-pending applications, enormous volumes of water-vapor are evaporated from a small unit volume of frozen substances. The volumes are enormous because of the necessary condition of high rarefication. Mechanical pumping of such enormous volumes under these conditions of high rarefication is not feasible on any practicable scale. The use of special means for removal of the water-vapor is therefore necessary. Air pumps, accordingly, are used for the removal of air in the establishment of the high vacuum, and, if desired, may then be cut off, provided the system is sufficiently free of leaks to maintain the high vacuum. Under this condition of high vacuum, the water absorbent (means for water-vapor removal) must be one which is sufficiently efficient to be capable of removal of the water-vapor rapidly enough so as not to interfere with the rapid evaporation of the frozen substance. In all previous processes, it has been the water absorbent which is responsible for the major cost of operation, and, although there have been definite steps made towards a lowered cost in this respect, there has not been any process which is sufficiently inexpensive for use with more than products of relatively very high value. Obviously, any process designed to be sufficiently inexpensive for use with products of low value will likewise have merit in lowering the cost of preservation or concentration of products of high value. This is particularly so, inasmuch as the public must pay a high price for such products even when not in optimum condition of preservation or concentration. The less the added cost of preservation, the greater the advantage is for the public.

The object, therefore, of this invention is to provide some new and novel methods through the use of which the benefits obtained in the practice of my co-pending application for the "Lyophile" processes, referred to above, are made economically possible both in small and large scale production for a wider range of products, such as through the "Cryochem" process, and thus made available for the public at large.

The "Lyophile" processes utilizing the methods and apparatus of my co-pending applications may be classified as follows and will be referred to as Scales of operation:

Scale A.—The general laboratory units set up in research and public health laboratories with a daily water removal capacity of ½ lb. (co-pending application No. 54,450).

Scale B.—The commercial biological units having a daily water removal capacity of 50 to 500 lbs. (co-pending application No. 54,149).

Both of the above can be carried out more cheaply by my new process.

Scale C.—The general commercial units, mainly for food products, requiring a daily water removal capacity of 2,000 to 20,000 or more lbs. Units of such size have not been feasible because of the high costs, etc.

As far as I am aware, the methods and devices (means) heretofore generally available for removal and collection of the water in dehydration from the frozen state are as follows:

Method 1.—Special condensers and a low temperature refrigerating mixture, "Dry-Ice" (see my co-pending "Lyophile" applications).

Method 2.—Low temperature mechanical refrigeration in place of #1.

Method 3.—Ordinary (non-regenerable) chemical desiccants (absorbents) such as calcium chloride, sulfuric acid or acid phosphoric anhydride, etc.

Method 4.—In addition to the above three methods, I have shown that a fourth method can be used. The water is removed by use of regenerable chemical desiccants such as (anhydrone) "Magnesium Perchlorate" described in U. S. Letters Patent No. 1,738,930, granted to G. F. Smith, December 10, 1929. Desiccants of this group, however, have been very expensive and require very elevated temperatures in connection with expensive vacuum and water-vapor condensing apparatus for regeneration, making the operating costs very high.

Method 3 has been used for the smaller capacities on Scale A but only in ordinary chemical laboratory desiccators.

Method 1 has been used on Scale A and to a limited extent on Scale B as well (50 lbs. maximum daily capacity).

Method 2 at present cannot be set up profitably for Scale A or B, because the large capital investment, required for low temperature mechanical refrigeration, would demand a much greater production capacity than there is opportunity for on either of those scales.

On the other hand, the market value of the products in the case of Scale C is so low that up to the present time it has not been feasible to apply Method 2 for operation on Scale C.

My new Method 4 could be used on all scales if a lower cost desiccant (lower in initial material cost and lower in cost of regeneration) could be found which would have the required degree of efficiency in absorption of the water-vapor as outlined above. For the desiccant to be low in initial cost, its source must be very common. For the regeneration costs to be low, the vacuum required for regeneration must be low, or no vacuum must be necessary. Furthermore, the temperatures required for regeneration must be very low. For such a substance to be so easily regenerable and yet to have a high enough efficiency in absorption of the water-vapor, it means that the chemical equilibrium reaction between the desiccant and its hydrate must have a very high temperature co-efficient of reversibility.

*Method 5.*—The new process according to my invention employs such a low-cost atmospheric (non-vacuum or very low vacuum) regenerable desiccant, in place of the low temperature condensers or chemical absorbents referred to above under Methods 1 to 4. Some such suitable chemicals are: anhydrous calcium sulphate; anhydrous lithium chloride; anhydrous copper sulphate; silica gel; aluminum oxide (such as sold under the trade name "Hydrola") anhydrous sodium sulphate; and anhydrous barium perchlorate (U. S. Letters Patent No. 1,798,175, granted to G. F. Smith on March 31, 1931), etc.

In my new method, designated Method 5, it is preferable to use, for most efficient operation, a desiccant forming a definite chemical hydrate; not the adsorption type such as silica gel. The latter will not function most satisfactorily because it does not have a fixed vapor pressure, the pressure gradually rising as water is absorbed. This rise commences instantly upon the adsorption of the first smallest portion of water-vapor. The former type has a fixed pressure until all of the chemical is converted to the first hydrate, whereupon the vapor pressure rises to that of the second hydrate.

To obtain the most efficient results in the practice of this invention, I prefer to use anhydrous calcium sulphate and in the form known by the trade-mark "Drierite" and described in U. S. Letters Patent No. 1,887,349 granted to William A. Hammond, November 8, 1932. This desiccant, because of the high temperature co-efficient of the reversible reaction whereby the first hydrate is formed, is regenerable at temperatures of 180° to 250° C. at atmospheric pressure, even though at ordinary room temperature the vapor pressure of the first hydrate is approximately the same as water-ice at the temperature of "Dry-Ice". I have found that it is amply efficient for economical use in the practice of my invention. "Drierite" is available on the market at a satisfactory price level and, in addition, it can be regenerated time and again at a very small cost and used over and over which renders its use in my process as a desiccant more economical than those heretofore available. "Drierite" is also very efficient because of its much greater porosity and because of a faster rate of regeneration. Furthermore, the regeneration process is not complicated by the necessity of precautions against fusion of the spent desiccant during the heating. The porosity and granular structure is maintained at the temperatures used in regeneration. Another major factor in economy of the "Drierite" method over either Method 1 or 2 is that the high losses in Methods 1 and 2, due to thermal leakage (insulation) at the low temperatures, continue at a constant rate whether or not operation is below capacity or at zero. With "Drierite," there is no such factor or loss under any conditions. "Drierite" can also be kept in storage for use as needed and made conveniently available in out-of-the-way sections of the country or in countries or localities where "Dry-Ice" is not obtainable. Furthermore, there are no acid or other deleterious vapors associated with the "Drierite" which would effect the quality of the products being dried.

Furthermore, because "Drierite" has an affinity for only water-vapor, it does not draw other volatile constituents from the products being dried. This is a distinct advantage over low temperature condensation because the low temperature causes a lowered vapor pressure of all substances and not only of the water-vapor, as is the case with "Drierite." To this extent also, "Drierite" is highly preferable over the ordinary desiccants formerly used on laboratory scale; that is, sulphuric acid and phosphorous pentoxide.

In addition to the above advantages, I have found in preserving serum by the "Cryochem" method that the process is much easier and simpler to carry out. The condensers used in the "Lyophile" apparatus, with all the accessories dependent on them, require constant care and attention and are a continual source of trouble. In the "Cryochem" process and apparatus, all these difficulties are eliminated because the condensers and their accessories are not used.

The "Cryochem" apparatus is therefore simpler in construction, easier to operate and requires considerably less attention. In general, the apparatus consists in the combination of a closed evaporating chamber connected to another closed chamber, designated as desiccator chamber, and this in turn is connected to a vacuum pump. The desiccant may be placed in thin layers within the chamber either vertically or horizontally with fine mesh screen used as partitions to provide open passages or ducts at close intervals so as to provide ample access of the vapors to the desiccant.

The evaporating chamber may be of any shape or size, from the size of a single small can to that of a good size room providing space for a large number of individual cans or containers as well as larger vats. The product may of course be pre-frozen in the same way as is the practice in the "Lyophile" process but, as the lower temperature freezing baths are not necessary nor condenser baths, it is usually more convenient to have provision made in the evaporating chamber for making connections to a mechanical refrigeration system. Here another advantage should be pointed out. When self-freezing is used by means of the de-gassing procedure described below, all the difficulties, concern, and need for extreme haste, which arise over the rapid attachment of the containers to the "Lyophile" apparatus in the beginning of the run, are eliminated.

For operating according to Scale A and B, or according to the "Lyophile" process and with any of the apparatus described and claimed in my co-pending applications, Serial Nos. 54,148; 54,149 and 54,450, the expensive condensers and "Dry-Ice" mixtures can be substituted by a simple vacuum chamber containing the relatively thin layers (¼" to 10") of the "Drierite" set out on trays or racks to permit re-circulation of the vapors around the desiccant. This simplification of the apparatus is a decided advance in the use of my process in the preservation of biologically active substances at reduced cost and also makes my process possible in countries where "Dry-Ice" is not obtainable.

*Method (a).*—For large production according to Scale C, the individual manifold outlets with small individual containers, as described in my co-pending applications, would be replaced by large pans or vats into which the food products or biological substances may be placed in thin layers for drying or concentration so as to present large evaporating surfaces. Here the product is first frozen by any available method such as "Dry-Ice," salt-water-ice mixture or mechanical refrigeration, and then dehydrated or concentrated from the frozen state. The temperature required for the satisfactory freezing of the material is any sub-freezing temperature. The dry or concentrated material is subsequently removed and packaged.

A very satisfactory and superior and economical method of accomplishing the initial freezing I have found to be by means of the vacuum-evaporation itself. A difficulty in the past, however, has been that frothing is usually caused when the dissolved gases are removed under high vacuum in attempting to freeze the liquids. To overcome this the material is de-gassed as follows. It is kept above the freezing point under low vacuum, for example at 1.5 to 25 millimeters or more of mercury, with or without the desiccant chamber in the system. The pressure is preferably maintained just above the point where frothing occurs. Ordinary ice, or ice-salt mixture, may be used as a cooling or chilling medium to prevent deterioration of substances, such as guinea pig complement, which in the liquid state must be kept well below 20° C., to prevent marked deterioration in the course of a few hours. After a suitable length of time (¼ to 10 hours) at this stage, de-gassing is complete. The desiccant chamber is then connected and the high vacuum (1.8 millimeters Hg or less) applied. Regardless of the rapid evaporation induced by this change in pressure in the system, frothing will not occur but almost immediate freezing of the material will take place, and the drying from the frozen state (concentrating or dehydrating) proceeds. In other words, in the absence of the usual dissolved gases, boiling does not occur even though the pressure is now below the point where boiling thermodynamically should occur at the temperature of the product. The substance remains in this super-heated condition until the rapid evaporation causes it to cool to 0° C. or lower and to freeze. Even without the use of the ice for chilling, there is some pre-cooling if the desiccant chamber is in the system as a result of slower evaporation during the de-gassing stage, and in many cases this is ample to prevent deterioration during the de-gassing stage. This degassing procedure has the further advantage insofar as the removal of entrained gases reduces the rate of subsequent deterioration which might be caused in many products by the gases, for example, by oxygen or carbon dioxide.

The degassing-self-freezing procedure results in a very sudden crystallization or freezing of the product. The product dried from the frozen state, after having been frozen initially by this procedure, has solubility characteristics with respect to the rapidity of dissolution and clarity that are superior to lyophile dried material (see my co-pending applications, Serial Numbers 54,148; 54,149; and 54,450, and those of Dr. Reichel).

The product is dried from the frozen state after being frozen initially by any means such as a sudden crystallization at a temperature which is equal to or just slightly below the actual freezing point of the material, the temperature being lowered gradually to this point so that the entire body of liquid is of a uniform temperature at all times. Therefore, when crystallization or actual freezing begins, it is completed with extreme suddenness throughout the entire mass and is distinctly different in effect from the so-called "rapid freezing" obtained by immersion of a container of material in an extremely low temperature bath, such as in a bath produced by Dry-Ice and an organic fluid medium where a progressive layer effect is obtained within this container.

*Method (b).*—In a modification of the above method, the food or biological product to be processed is placed directly in market distribution containers and, after the material has been frozen and dehydrated, the containers closed and sealed. This closing and sealing of the containers may be accomplished by any of several available vacuum sealing methods.

In the preceding paragraphs, I have described two methods of handling the material to be dehydrated, which methods may be considered as the continuous process and will be referred to here as:

(a) Continuous bulk dehydration { Food products, Serum (b) Continuous multiple container concentration or dehydration { Food products, Serum It may not always be possible to practice Methods (a) and (b). Some materials of a gummy (very viscous) nature when processed (concentrated) according to Method (a), as, for example, orange juice, would be very difficult to weigh or measure out into small containers. On the other hand, some products will be considerably reduced in volume when dehydrated and if Method (b) were used, the containers would have to be several times larger than needed for the finished product. These difficulties, however, can readily be overcome by combining (a) and (b) in a method hereafter referred to as:

*Method (c)—Concentrating-dehydrating method—Two-stage process.*—According to this method, the liquid material would be placed in the large pans for freezing and partial dehydration. For example, 75% to 95% of the total moisture content may be removed by Method (a) and then the concentrated bulk thawed and placed in the final containers and the dehydration finished as per Method (b). The actual degree of concentration permissible in the first step will naturally vary with each different product. When a standard has been established, however, for the particular material, it is easy to determine, by some simple method, such as for example a conductivity method, when the degree of dehydration has reached the desired concentration. The process is then stopped. At this point the thawed concentrate is rather thick but yet sufficiently fluid to flow into the final containers.

The principles described in my co-pending application pertaining to self-regulation and automatic regulation of the temperature of the frozen material during the evaporation applies equally well in the practice of this invention. Once the material has been frozen and placed in the vacuum system, the rapid evaporation caused by the desiccant is sufficient to maintain the frozen state until the material is dehydrated without the aid of outside refrigeration. The air at room temperature merely serves to supply the required heat to the containers for rapid evaporation.

It has been found, however, that with the use of this desiccant "Drierite," a pressure as high as 1.8 millimeters Hg is sufficiently low to allow the automatic refrigeration principle to operate, rather than 0.7 millimeter, as in the "Lyophile" process, although a pressure below 0.2 mm. of Hg is preferable to allow the most rapid attainment of the completion of the dehydration.

Under certain conditions, however, it may be advantageous to operate at pressures somewhat above that at which the principle of automatic refrigeration will apply. If so, outside refrigeration may be used as a supplement to the cooling provided by the evaporation or sublimation of the drying product. This supplementary outside refrigeration should be sufficient to maintain the frozen state or semi-frozen state during the drying (concentrating and/or dehydrating).

The first hydrate of "Drierite" is $(CaSO_4)_2H_2O$ and the water content of this is 6.6% by weight. I have found that this desiccant is of ample efficiency for the various purposes of this invention, as set forth above, until it has absorbed sufficient water to convert about 95% of any given quantity of the anhydrous material to this first hydrate (the half-hydrate). This represents approximately 6.3% of the weight of the original anhydrous substance. It has been found possible, however, to dry additional product to the extent of 1-5% of the weight of the desiccant. The temperature of the drying substance is not maintained as low and it is not dried to the same final degree of dehydration. Nevertheless, this nearly doubles the quantity of material that can be dried. Therefore, by the use of this additional capacity in the beginning on any one batch, followed by the use of fresher desiccant at the end, in order to complete the final degree of dehydration, a considerable increased total capacity may be obtained. On large scale operation, however, the added capacity is not of such great advantage as it might at first appear to be. This is because the major cost of regeneration is in supplying the heat to remove the water. This quantity of heat is the same irrespective of whether or not it is used to remove the given amount of water from one ton or from two tons of desiccant. The only saving is in the cost of additional handling and in the cost of raising the temperature of the desiccant itself. In view of the low specific heat of the desiccant, the added cost is not very great. In fact, because desiccants in general which absorb much more water than 6-7% of their weight tend to lose their original porosity and to crystallize on regeneration, it becomes somewhat disadvantageous to use desiccants which are of very great capacity. That is, beyond certain limits, the law of diminishing returns sets in with respect to increased capacity of a desiccant.

It has been further found, however, that in any one batch of substance being dried, the total quantity of moisture to be removed must not exceed ⅓ to ½ of the total capacity of the desiccant. This is because the heat of reaction between the water-vapor and the desiccant raises the temperature of the desiccant to as much as 90-100° C., when more than ½ the total capacity is dried in one batch. This temperature is reached in about one to two hours after the drying is begun and results in slowing up the process so that the principle of automatic refrigeration of the drying substance becomes inoperative. By use of outside refrigeration around either the desiccant or the drying substance, a greater quantity may be dried in one batch. This is not a preferred method, however; it is more expedient to use a larger quantity of desiccant. After the completion of the drying of the one batch, the same desiccant may be used, as it is, for a second batch, and so on until the quantity of water absorbed from the several batches reaches 6.3% of the weight of the desiccant.

In order to minimize the rise in temperature of the desiccant, the chambers should be constructed of good thermal-conducting materials. Because of the very high degree of vacuum in the system, not much help from thermal-conductance of residual air or gases can be obtained. The containers or trays for the desiccant should be made of heavy metal and good thermal contact made with the outside walls of the chamber. Heavy aluminum or alloys similiar in thermal characteristics are excellent for the purpose. Because of the poor thermal-conductivity of a desiccant under vacuum, which for other reasons must be very porous in nature, either internal water-cooling coils should be used or heavy fins should be placed in the trays to gather up the heat and to carry it to the walls of the chambers. Likewise, fins on the outside of the chamber for air-cooling are of tremendous advantage. In fact, by use of suitable construction of the chambers, it is possible to attain a condition, if necessary, where nearly 100% of the total efficient capacity of the desiccant may be utilized in a single batch.

It should be pointed out that, in any event, irrespective of the temperature reached by the desiccant when it is doing the maximum rate of work in the early hours of the drying of any one batch, toward the completion of the drying the temperature falls to that of the room, say 20-50° C. Accordingly, the maximum drying potential of the desiccant then is obtained for lowering the residual moisture content of the final dry product to a minimum value.

In about 20 hours of drying, a substance such as horse serum will lose about 99.9% of its original moisture. This residual moisture content corresponds to approximately 1-2% of the weight of the solids of the substance (such substances usually containing originally 6-9% of total solids in solution). By increasing the time of drying or by making the layers thinner, it is possible to reduce the residual moisture content of the dry solids to less than 0.5%. This is an index of the great efficiency of this desiccant in the process.

I have found that the "Drierite" may be used as many as 50 times, with as many as 50 regenerations, and no loss in drying efficiency in my process has been noted. For this reason, it may be said that "Drierite" in my process may be used an indefinite or unlimited number of times. This further means that, for large scale commercial operation, the major factor of cost is the power used in operation and this is equivalent to only that amount of heat necessary to remove and evaporate the desired quantity of water from the desiccant at 150-250° C. This is so, even though the water is actually being removed from the product while it is at a sub-freezing temperature. Therefore, by taking advantage of by-product heat utilization, because water-vapor at 150-250° C. has considerable economic value, the cost of operation may be reduced to an exceptionally low point.

In order to accelerate the regeneration of the desiccant, it is advantageous to have the pans containing it of heavy screen or other open mesh-like construction. The open nature of the bottoms, as well as the open tops facilitate the removal of the hot vapor. The heavy construction is for thermal reasons, pointed out above. This open-bottom construction is also of advantage in the drying-cycle.

The method described in my co-pending application for "Lyophile" products requires a very low temperature for the condenser, around minus 70° C. or lower. It has now been found that a temperature of around minus 20° C. is sufficiently low to allow the automatic refrigeration of the product being dried to proceed, although the full final degree of dehydration cannot be attained with this temperature. The exact amount of water removable will vary from product to product and the optimum condenser temperature will vary. At any rate, mechanical refrigeration at these higher temperatures may be used for operation on Scale B or C for the removal of a portion of the water, as for example in the first stage of Method (c). When only concentration and not complete dehydration is required, this first stage in many cases will be ample for the purpose. Where the minus 20° C. condenser or some form of mechanical refrigerator is used for the first stage of Method (c), the final stage of complete dehydration may be accomplished by means of either a suitable desiccant or a lower temperature condenser, say at around minus 40° C. or lower (mechanical refrigeration or with dry-ice).

Also, in place of the condenser, or in place of the fixed hydrate type of atmospheric pressure, heat regenerable chemical desiccant, the less efficient adsorption type of atmospheric pressure, heat regenerable chemical desiccant may be used under certain conditions for this first stage in Method (c).

An important feature in drying food products according to the "Cryochem" process is that only a reasonable approximation to aseptic conditions need be maintained in handling, and subsequent pasteurization is unnecessary if the products before hand have been free of pathogenic organisms. Even if a few micro-organisms are present initially, they cannot mutiply under these conditions when stored in such a highly dehydrated state. The elimination of pasteurization results in a higher quality product.

I do not intend to be limited save as the scope of the attached claims may require.

I claim:

1. A process of treating and preserving liquid or semi-liquid food or biological substances which comprises: de-gassing the substance by exposing it in liquid condition to a vacuum of a pressure substantially below atmospheric pressure but not less than 1.5 millimeters of mercury absolute pressure for a suitable length of time; then initially freezing the substance by raising the vacuum and exposing the substance to the action of a desiccant; subliming the contained water from the substance while in a frozen condition by the action of the higher vacuum and the desiccant; and collecting the sublimate as a chemical hydrate.

2. A process according to claim 1 in which the temperature of the substance is controlled during the de-gassing step by passing a cooling medium in heat transfer relation with the substance.

3. A process according to claim 1 in which the de-gassing step is performed for less than 10 hours.

4. A process of treating and preserving liquid or semi-liquid fluid or biological substances which comprises degassing the material by subjecting it to a moderate vacuum and a low but above freezing temperature for a period of time in excess of 15 minutes, thereafter subjecting the material to a high vacuum so as to freeze it and at the same time subjecting it to the action of a regenerable non-deliquescent solid desiccant to remove the last traces of moisture therefrom.

5. A process of treating and preserving liquid or semi-liquid food or biological substances which comprises degassing the material by subjecting it to a moderate vacuum at above freezing temperatures, for a period of not less than about 15 minutes, thereafter subjecting the material to a high vacuum to effect freezing thereof, and removing the water vapor as rapidly as it is drawn off.

6. A process of treating and preserving liquid or semi-liquid food or biological substances which comprises degassing the material by subjecting it to a moderate vacuum at above freezing temperatures, for a period of time sufficient to effect substantial degassing of the material, thereafter subjecting the material to a high vacuum to effect freezing thereof, and removing the water vapor as rapidly as it is drawn off, while maintaining the material in a frozen state until substantially dry.

7. A process of treating and preserving liquid or semi-liquid food or biological substances which comprises degassing the material by subjecting it to a moderate substantially constant vacuum at a temperature above freezing, maintaining the pressure substantially constant at a value not less than the vapor pressure of the material at said temperature for a period of time sufficient to effect substantial degassing of the material, thereafter subjecting the material to a high vacuum to effect freezing thereof, and removing the water vapor as rapidly as it is drawn off.

8. A process of treating and preserving liquid or semi-liquid food or biological substances which comprises degassing the substance by exposing it in liquid condition to a vacuum of a pressure substantially below atmospheric pressure but not less than 1.5 mm. of mercury absolute pressure for a suitable length of time while controlling the temperature of the substance by passing a cooling medium in heat transfer relationship therewith; then initially freezing the substance by raising the vacuum; subliming the contained water from the substance while in a frozen condition by the action of the higher vacuum and removing the water vapor as rapidly as it is drawn off.

EARL W. FLOSDORF.

CERTIFICATE OF CORRECTION.

Patent No. 2,225,627. December 24, 1940.

EARL W. FLOSDORF.

It is hereby certified that error appears in the printed specification of the above numbered patent requiring correction as follows: Page 1, second column, line 25, for the words "the the" read --the--; page 4, second column, line 2, for "food or biological product" read --food product or biological--; page 5, second column, line 27, for "50°" read --25°--; page 6, first column, line 36, for "mutiply" read --multiply--; and second column, lines 37 to 40 inclusive, claim 7, strike out the comma and words ", maintaining the pressure substantially constant at a value not less than the vapor pressure of the material at said temperature"; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.

CERTIFICATE OF CORRECTION.

Patent No. 2,225,627.                                          December 24, 1940.

EARL W. FLOSDORF.

It is hereby certified that error appears in the printed specification of the above numbered patent requiring correction as follows: Page 1, second column, line 25, for the words "the the" read --the--; page 4, second column, line 2, for "food or biological product" read --food product or biological--; page 5, second column, line 27, for "50°" read --25°--; page 6, first column, line 36, for "mutiply" read --multiply--; and second column, lines 37 to 40 inclusive, claim 7, strike out the comma and words ", maintaining the pressure substantially constant at a value not less than the vapor pressure of the material at said temperature"; and that the said letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.